Inventor:
Arthur H. Maynard
By
Attorneys.

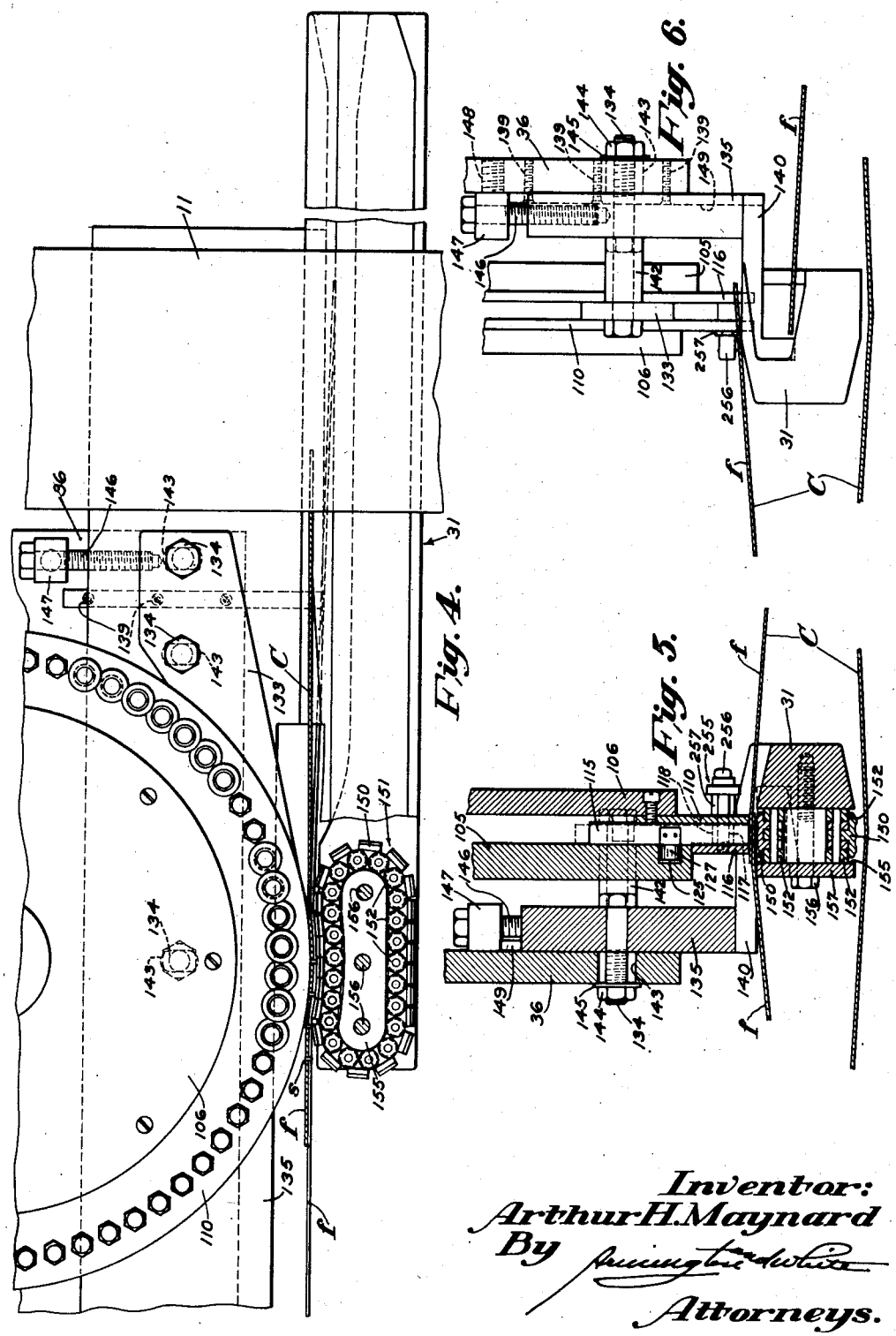

Oct. 20, 1953     A. H. MAYNARD     2,655,654
ROTARY WIRE-STITCHING MACHINE
Filed June 5, 1952     12 Sheets-Sheet 5

Inventor.
Arthur H. Maynard
By
Attorneys.

Oct. 20, 1953  A. H. MAYNARD  2,655,654
ROTARY WIRE-STITCHING MACHINE
Filed June 5, 1952  12 Sheets-Sheet 6

Inventor:
Arthur H. Maynard
By
Attorneys.

Oct. 20, 1953  A. H. MAYNARD  2,655,654
ROTARY WIRE-STITCHING MACHINE
Filed June 5, 1952  12 Sheets-Sheet 7

Inventor:
Arthur H. Maynard
By
Attorneys.

Inventor:
Arthur H. Maynard
By
Attorneys.

Oct. 20, 1953

A. H. MAYNARD 2,655,654

ROTARY WIRE-STITCHING MACHINE

Filed June 5, 1952

Inventor:
Arthur H. Maynard
By
Attorneys.

Inventor:
Arthur H. Maynard
By
Attorneys

Patented Oct. 20, 1953

2,655,654

UNITED STATES PATENT OFFICE 2,655,654

ROTARY WIRE-STITCHING MACHINE

Arthur H. Maynard, Westerly, R. I., assignor to Bostitch, Inc., Stonington, Conn., a corporation of Rhode Island Application June 5, 1952, Serial No. 291,906

20 Claims. (Cl. 1—11)

This invention relates to improvements in wire-stitching or stapling machines and particularly to an automatic machine for continuously driving and clinching staples in articles feeding through the machine. As herein illustrated and described, the present improved machine is adapted for use in connection with carton-blank feeding and folding machines for stitching together the flaps of the blanks as the latter are fed one after another to the stitching mechanism. The present machine, however, is also adapted for applying staples to other kinds of articles in other types of work.

One object of the invention is to provide a rotary stitcher-head having means for feeding and forming wire into staples and continuously actuated to apply the staples to the work one after another in rapid succession.

Another object is to provide a rotary stitcher-head for continuously driving and clinching the staples to apply them in a row for forming a seam in the article being stitched.

Another object is to provide a rotary stitcher-head having means for continuously feeding wire, severing lengths therefrom, forming the lengths into staples, and continuously setting the staples in the work.

Another object is to provide means for adjusting the staple-forming and driving means to regulate the spacing of the staples at different distances apart in accordance with the requirements of the work.

Another object is to provide clinching means for cooperation with the staple-driving means to bend over the legs of the staples and clinch them on the under side of the work with means for advancing the clinching means during the feeding of the work.

Another object is to provide stopping means for arresting the operation of the wire-feeding, staple-forming, and staple-driving means during intervals when the work fails to feed beneath the stitcher-head.

Further objects of the invention are set forth in the following specification which describes one preferred form of construction of the machine as applied to a particular type of work. The specification is illustrated by the accompanying drawings in which:

Fig. 4 is a partial view of the rotary stitcher-head shown in connection with the travelable clinching means;

Fig. 5 is an enlarged detailed view showing one of the driver-bars and its connection to the cam for reciprocating it and also illustrating the cooperative relation between the driver-bar and the clinching means;

Fig. 6 is a similar view illustrating the manner in which the carton-flaps are folded to overlap them for stitching in the relationship shown in Fig. 5;

Stitcher-head applied to blank-feeding and folding machine

The embodiment of the invention herein disclosed, by way of illustration, consists in a rotary stitching- or stapling head for use with blank-feeding and folding machines such, for example, as illustrated in United States Letters Patent No. 2,574,527 dated November 13, 1951. In general, the blank-feeding and folding machine as herein illustrated is constructed with a horizontal table 2, see Fig. 1, mounted at either end on channel-iron legs or standards 3 and 4 which are braced by horizontal channel-iron stringers 5 extending therebetween with lateral stringers 6 and 7 supporting the table 2. The table 2 may be composed of a plurality of flat metal strips 9 arranged in spaced relationship and supported on the lateral stringers 6 and 7, see Fig. 2, as is a usual construction.

Mounting for stitcher-head

Figure 1:
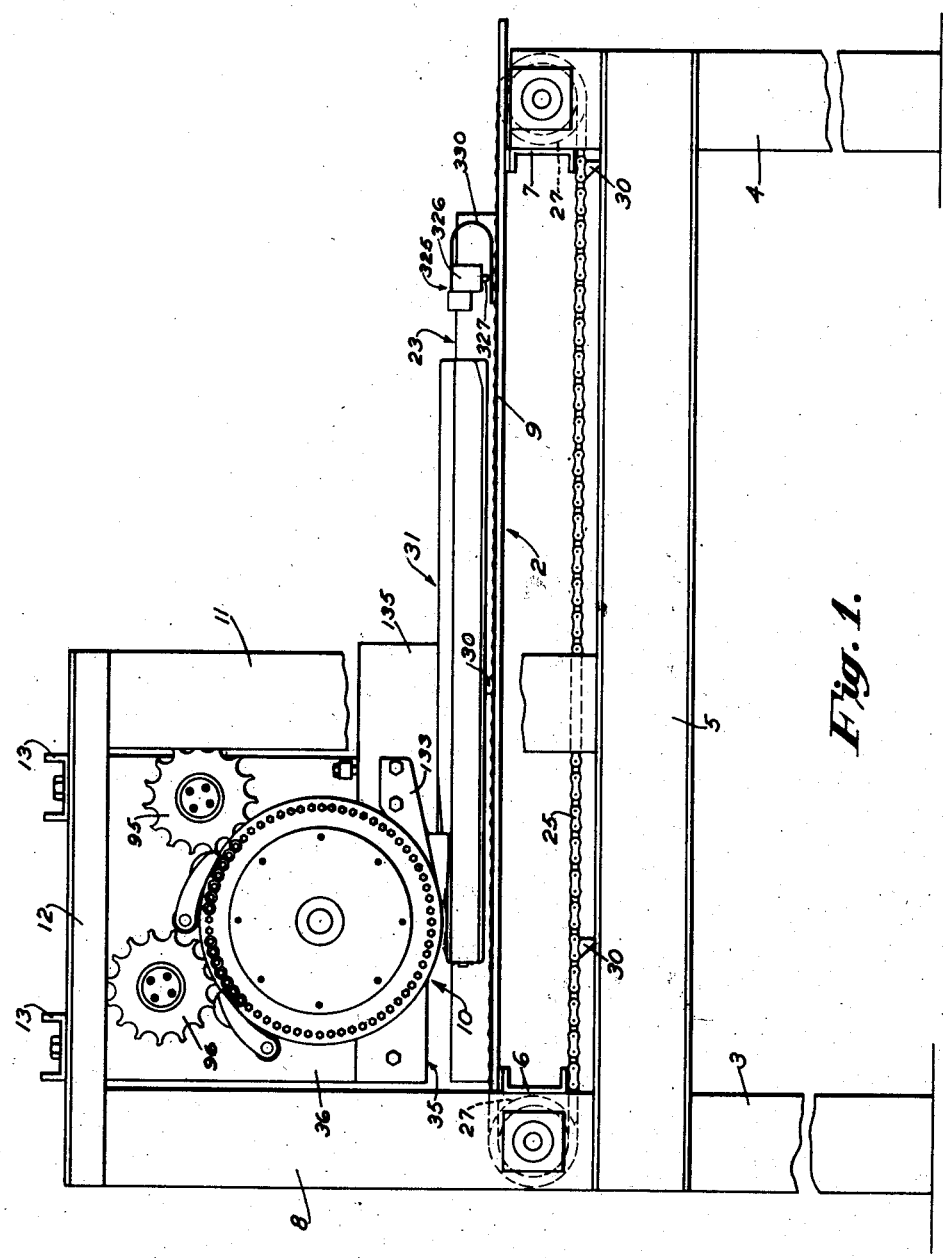
Fig. 1 is a side elevational view showing the rotary stitcher-head applied to use for stitching together the flaps on carton-blanks as they are advanced in a blank-feeding and folding machine.
Figure 2:
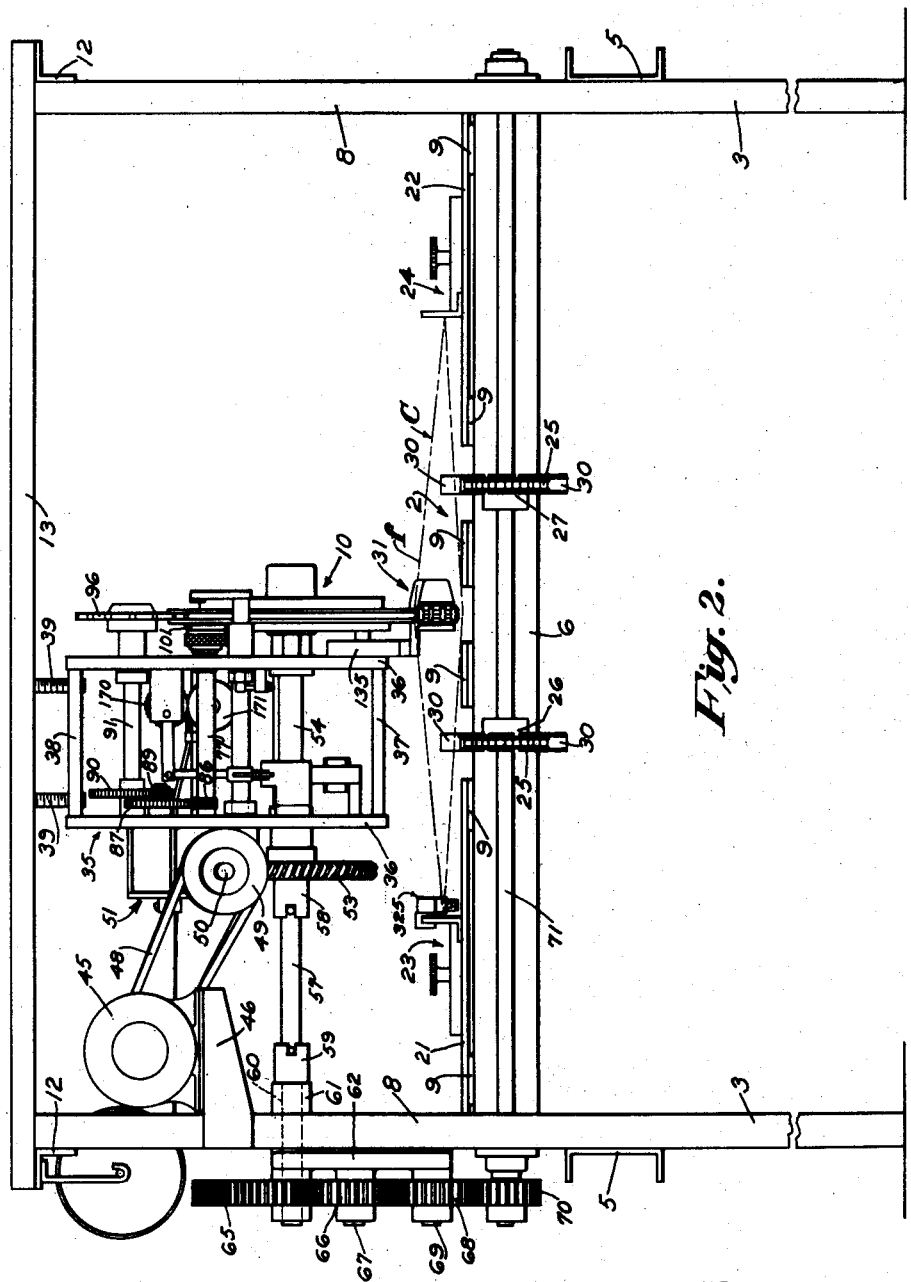
Fig. 2 is an end elevational view of the same looking in the direction as viewed from the left in Fig. 1.

The standards 3 at the head end of the machine are extended upwardly in lengths 8, see Fig. 2, to provide part of the mounting or support for the rotary stitcher-head, indicated generally by the reference character 10. As shown in Fig. 1, a pair of similar uprights 11 are supported from the horizontal side stringers 5 and connected to the extensions 8 of the legs 3 by means of angle-iron cross-pieces 12. Horizontal channel-iron stringers 13 welded at their ends to the angular cross-pieces 12 extend laterally of the machine and form the support for suspending the stitcher-head 10 therefrom, see Fig. 2.

Blank-guiding and feeding means

Referring to Fig. 2, plates 21 and 22 mounted on certain of the longitudinal strips 9 carry blank-guiding means 23 and 24 which are adjustable toward and away from each other to adapt them to engage the edges of a carton-blank C, indicated by dot-and-dash lines in Fig. 2, to direct it in its course beneath the stitcher-head, these elements being of usual construction and arrangement and not herein described in detail as they form no part of the present invention. A pair of endless chains 25 passing over suitable sprocket wheels 26 and 27 at either end of the table 2 have their upper courses extending between certain of the strips 9 and carry upwardly-projecting dogs or pushers 30 for engagement with the rearward edges of the carton-blanks to feed them forwardly on the table 2. A usual type of folding means, not herein shown or described, operates to fold the flaps $f$ of the blank C inwardly from its sides and cause them to be overlapped at the center by guiding means 31 shown in Figs. 5 and 6, these parts being of usual construction and arrangement and not herein shown and described in detail. The flap-guiding means 31 is supported from a cage-like framework, indicated generally in Fig. 2 by the reference character 35, suspended from the laterally-extending channel-irons 13 mounted on the cross-pieces 12. The framework or cage 35 consists of a pair of rectangular plates 36 held in opposite spaced relationship by cross-members 37, 38 and is suspended from the channel-irons 13 by means of bolts 39 clamped by check-nuts 40 with their lower ends threaded through the upper plate 38, see Figs. 2 and 3. The check-nuts 40 are tightened against the under side of the channel-irons 13 and may be loosened for turning the bolts 39 to raise or lower the framework 35 in adjusting the stitcher-head 10 in accordance with the character of the work. The framework 35 is provided with certain journals, later described, for rotatably mounting the shafts which operate the stitcher-head 10 and its co-related mechanism.

Stitcher-head driving means

Figure 17:
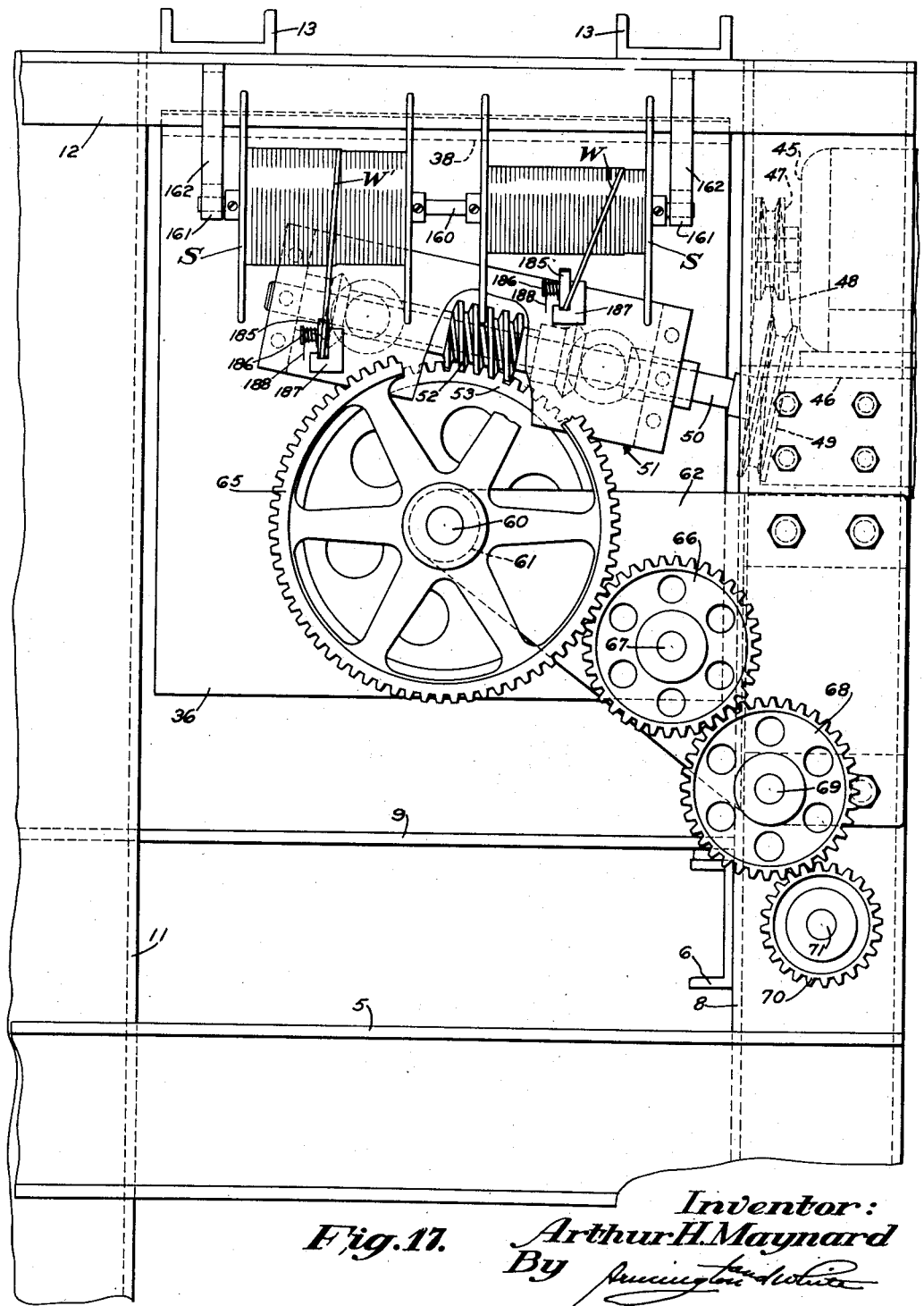
Fig. 17 is an enlarged detailed view of the driving gears at one side of the machine.

Referring to Figs. 2 and 17, an electric motor 45 mounted on a shelf 46 projecting from the upper extension 8 of the leg or upright 3 supplies the motive power for driving the mechanisms of the stitcher-head 10. As shown in Fig. 17, the armature shaft of the motor 45 carries a grooved pulley 47 connected by a belt 48 to a larger pulley 49 on the end of an inclined shaft 50. The shaft 50 is journaled in bearings on a supporting bracket 51 which is bolted or otherwise suitably fastened to one of the plates 36 of the framework 35. The shaft 50 carries a worm 52 which meshes with the teeth of a worm gear 53 on a shaft 54 which is journaled in bearings 55 and 56, see Fig. 15, in the side plates 36 of the framework 35, the shaft 54 serving to drive the rotary stitcher-head 10 mounted on its end. The shaft 54 is connected to an extension shaft 57 by means of a universal joint 58, and a second universal joint 59, see Fig. 2, connects the shaft 57 with a shaft 60 journaled in a bearing 61 on an angular bracket 62 fastened to the extension 8 of the leg 3. The shaft 60 carries a gear 65 fast thereon and forming part of a train for driving the endless chains 25. The universal joints 58 and 59 between the shaft 54 and shaft 60 permit the framework 35 and the stitcher-head 10 to be adjusted up or down in accordance with the height required for operation on carton-blanks varying in size.

The gear 65 driven from the shaft 60 meshes with a gear 66 which is journaled on a stub shaft 67 mounted on the angular bracket 62. The gear 66 meshes with a gear 68 journaled on a stub shaft 69 on the bracket 62 and this latter gear 68 meshes with a gear 70 which is fast on the end of a horizontally-extending shaft 71, see Fig. 2, journaled in bearings on the legs 3 which support the main frame of the machine. The shaft 71 carries the pair of sprocket wheels 26 and 27 at one end of the machine frame for driving the endless chains which feed the carton-blanks along the table 2 to the stitcher-head 10.

Figure 15:
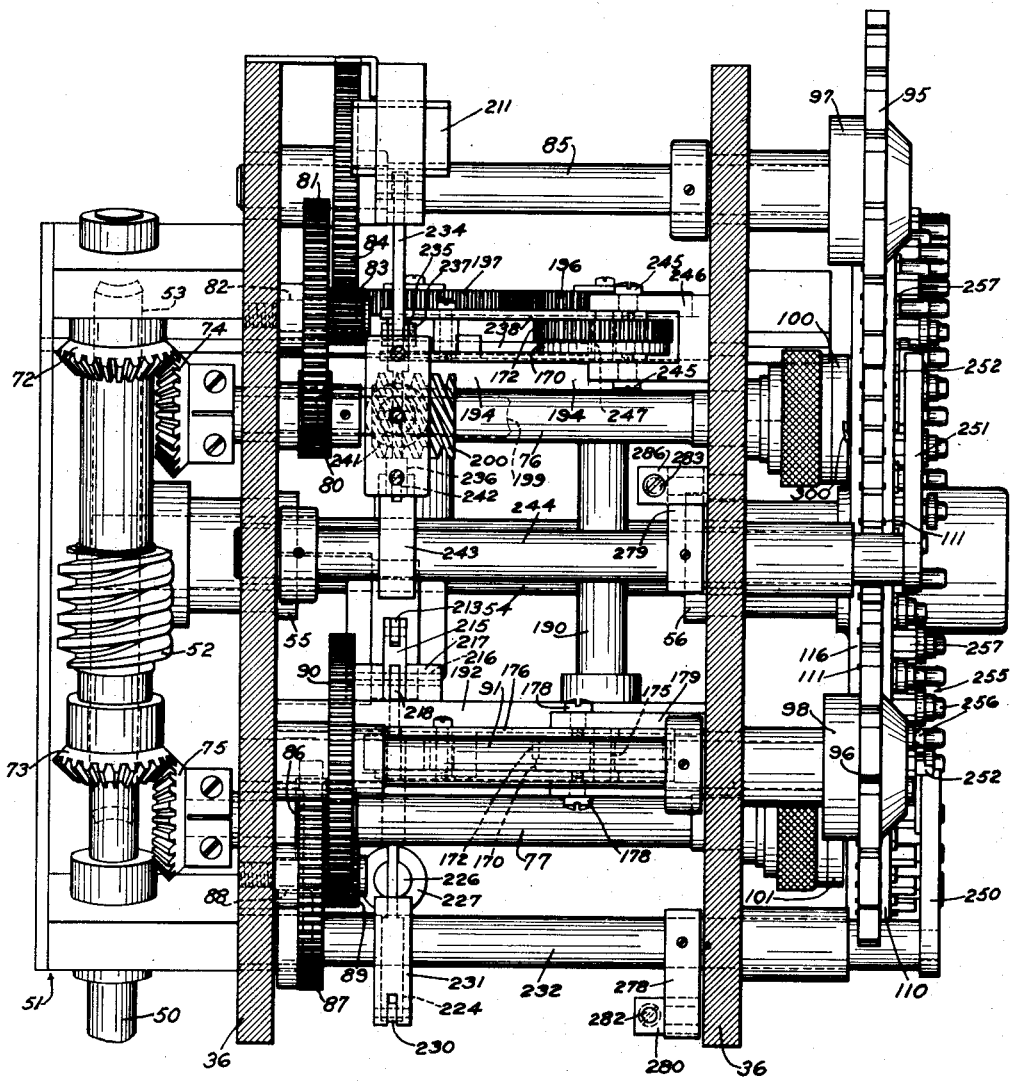
Fig. 15 is a general plan view of the rotary head showing the side plates thereof in section and illustrating the gearing for driving the mechanism.
Figure 16:
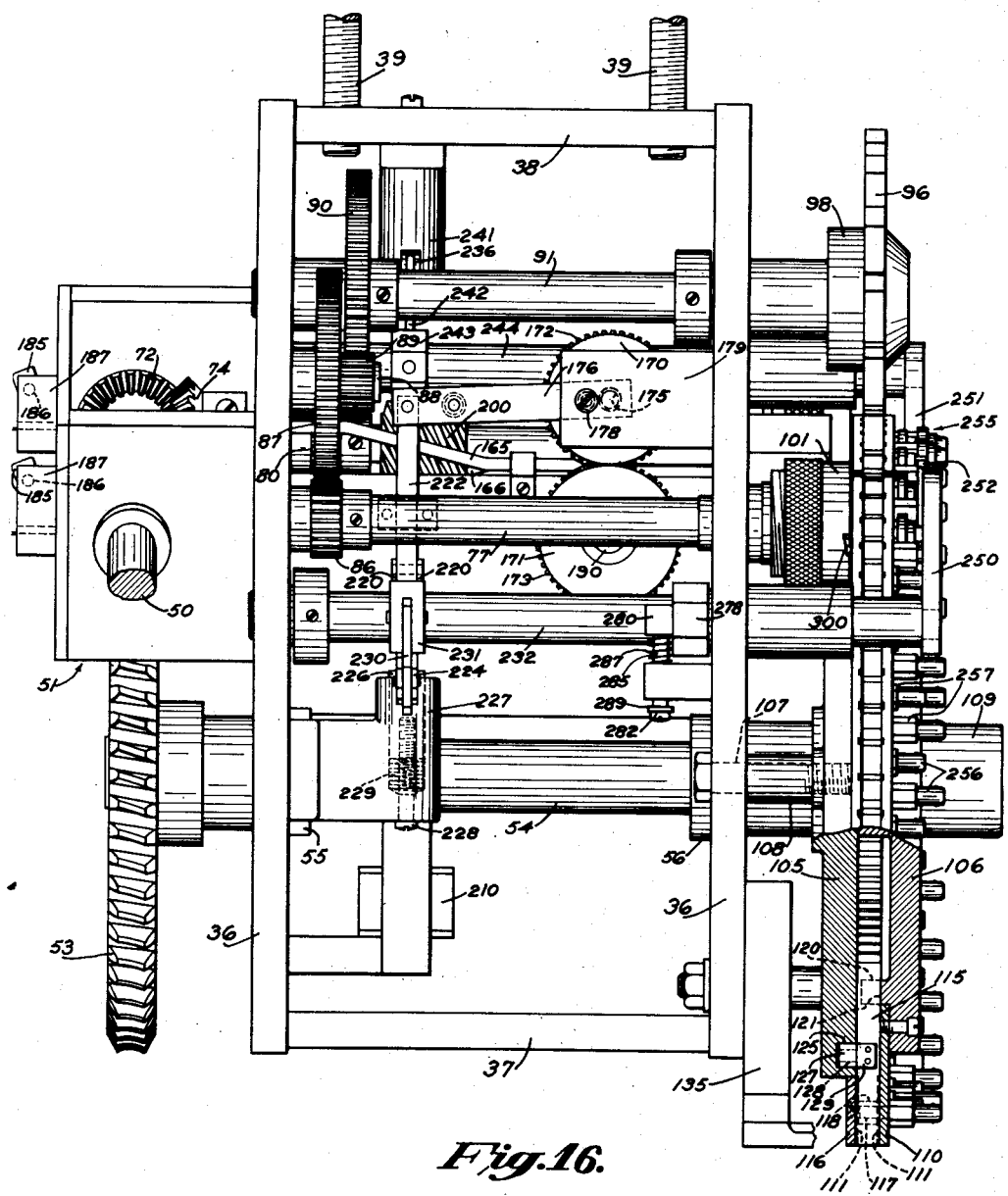
Fig. 16 is an enlarged elevation of the rotary stitcher-head viewed from the right as shown in Fig. 1 and illustrating the gearing for driving the head and its cooperating mechanisms.

Referring to Figs. 15 and 16, the shaft 50 carrying the worm 52 also has fast thereon two beveled-gears 72 and 73 meshing with similar bevel-gears 74 and 75 on shafts 76 and 77, respectively, which are journaled in bearings in the opposite side plates 36 of the framework 35. The shaft 76 carries a pinion-gear 80 meshing with a larger spur-gear 81 journaled on a stub-shaft 82 on the side plate 36. The gear 81 carries a smaller pinion 83 meshing with a larger gear 84 on a cross-shaft 85 which is journaled in bearings in the side plates 36. The shaft 77 carries a pinion-gear 86 meshing with a larger gear 87 journaled on a stub-shaft 88 and carrying fast therewith a pinion-gear 89. The pinion-gear 89 meshes with a larger gear 90 on a shaft 91 journaled in bearings in the side plates 36. The shafts 85 and 91 carry toothed disks 95 and 96, respectively, formed with hubs 97 and 98 fastened to the ends of said shafts, see Fig. 3. The disks 95 and 96 are constituted as staple-formers with peripheral teeth 99 of peculiar shape adapted to wipe across the severed lengths of wire $w$, see Figs. 9 and 10 and bend the wire into U-shaped staples $s$ in a manner as more fully explained hereinafter. The shafts 76 and 77, previously referred to, carry wire-cutters 100 and 101 for severing relatively short lengths $w$ from the strips W and W' to be formed into staples $s$, the construction of these elements being shown in detail in Figs. 11 and 12 and described more particularly hereinafter.

Stitcher-head construction

Figure 3:
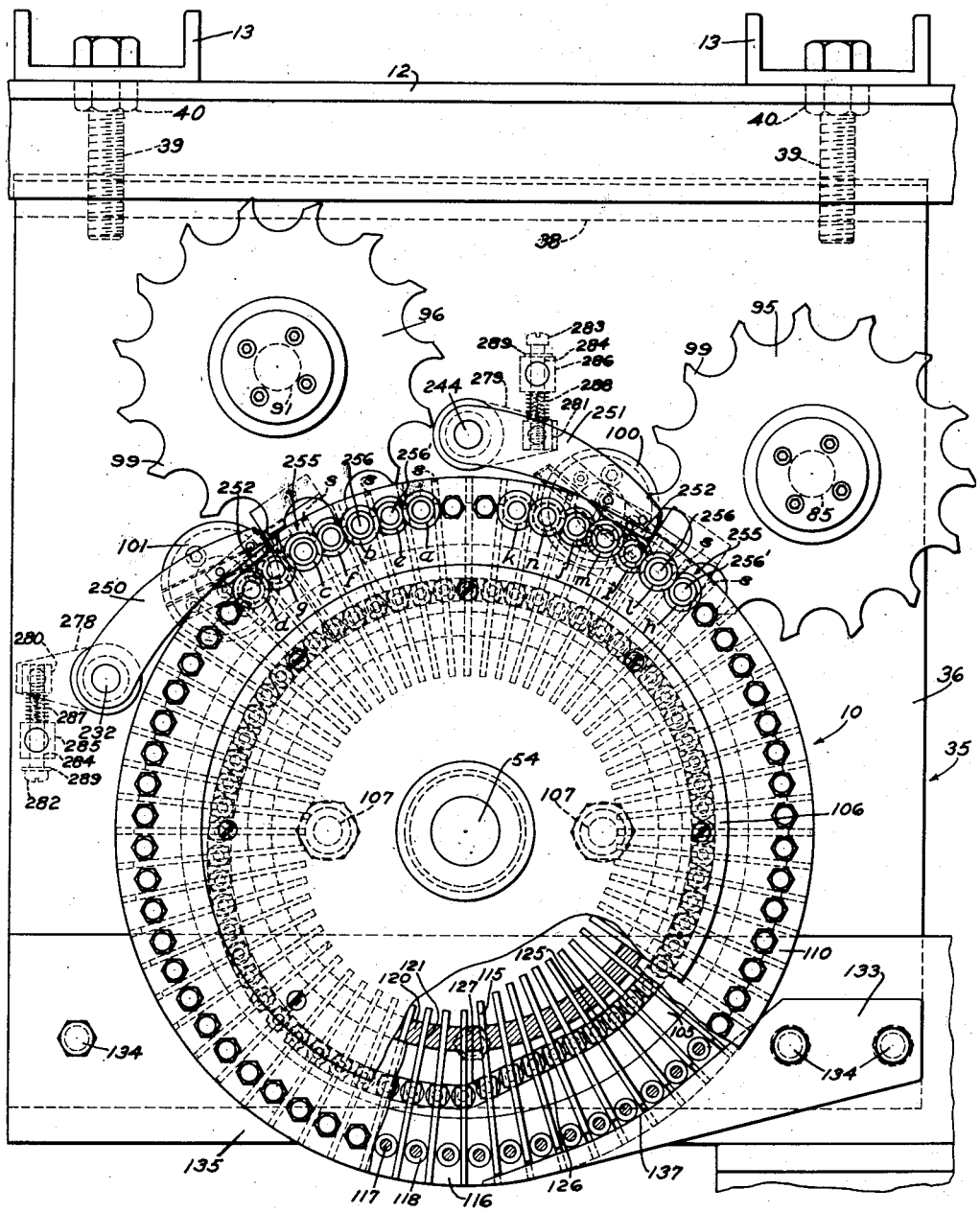
Fig. 3 is an enlarged side elevational view of the rotary stitcher-head showing the wire-feeding, length-severing means, and staple-forming means, with a portion of the head broken away to reveal the arrangement of the multiple driver-bars and the cam for reciprocating the bars.

Referring to Figs. 3 and 16, the rotary stitcher-head 10 comprises two opposed circular plates or disks 105 and 106 of relatively large diameter arranged in parallel relationship on the same axis and spaced a slight distance apart. The inner disk 105 is loosely mounted on the drive-shaft 54 and held from turning thereon by means of a pair of bolts 107 having their shanks inserted through the side plate 36 of the framework 35 and extending through sleeves 108 with their threaded ends screwed into the disk. The opposite or outer rotary disk 106 is of slightly less diameter than that of the inner disk 105 and has its hub 109 suitably secured fast on the drive-shaft 54 to adapt it to be rotated thereby. The rotary disk 106 is provided with an annular extension or flange 110 fastened to its inner face and projecting radially a slight distance outwardly beyond the rim of the disk. The annulus or flange 110 is formed with a multiplicity of shallow radial slots 111 in which are slidably mounted a plurality of driver-bars 115 adapted to be reciprocated during the rotation of the disk for driving the staples into the work at a point where the lower rim of the disk is disposed above the folding guide 31, shown in Fig. 5. A similar annular flange 116 surrounding the rim of the stationary disk 105 is fastened in spaced relation to the flange 110 by means of studs 117 with spacing collars 118 on the studs. The flange 116 is also formed with shallow slots 111 registering with the similar slots in the flange 106 to provide guideways for the driver-bars 115. Projecting inwardly from the face of the disk 106 is a relatively narrow annular rib 120 formed with slots 121 in which the inner ends of the driver-bars 115 are slidably supported.

Staple-driving means

The driver-bars 115 are reciprocated in their slots 111 and 121 as they revolve with the disk 106 during clockwise rotation thereof, a cam-groove 125 in the face of the fixed plate or disk 105, see Fig. 3, being provided for this purpose. The cam-groove 125 is of generally circular outline disposed eccentrically with respect to the axis of the disk 106 and having a relatively straight inwardly-directed portion at 126 for forcing the driver-bars radially outward in their guideways on the rotary disk 106 to drive the staples into the work. The driver-bars 115 carry cam-followers in the form of rollers 127, see Fig. 9, journaled on spindles 128 projecting from bifurcated supports 129 riveted to the opposite sides of the bars 115. As shown most clearly in Fig. 9, the crossbar 130 of each support or mounting 129 is let into a slot in the side of the bar 115 and the rollers 127 are held on the spindles 128 by spring-rings 131 snapped into grooves in the end of the spindles.

In some instances a guard-plate 133, see Fig. 3, may be attached by bolts 134 to the side of a horizontal rail 135 which overlies the side of the plate 36 of the framework 35. Referring to Figs. 4 and 16, the rail 135 is supported by the bolts 134 which are slidable in vertical slots in the plate 36 to adapt it to be adjusted up or down thereon by means later described. The guard 133 has a tapering extension with an arcuate edge 137 projecting into the space between the flanges 110 and 116 surrounding the rims of the two disks 105 and 106. The arcuate edge 137 of the guard 133 underlies the heads or crossbars of the staples $s$ as a precautionary measure to prevent the staples escaping from the slots in the head 10 if they fail to be held frictionally therein.

Flap-guiding means

Referring to Figs. 5 and 6, the guide 31 which serves as a support for guiding the ends of the folded flaps $f$, $f$ of the carton-blank C is suspended from the rail 135 by a shelf-like strip 140 projecting from the bottom of the rail to which the guard-plate 133 is attached. Certain of the bolts 134 are of sufficient length to extend through the guard 133 and sleeves 142 with their shanks projecting through the rail 135 and the plate 36 of the framework 35. These bolts 134 are slidable in slots 143 in the plate 36 to adapt the flap-guide 31 to be raised or lowered to regulate the space between it and the rim of the rotary head 10. Nuts 144 set up against washers 145 serve to tighten the bolts 134 to clamp the rail 135 in its adjusted position. For convenience in adjusting the vertical position of the flap-guide 31 a bolt 146 is mounted to turn in a lug 147 fastened to the side of the plate 36 by a threaded stud 148, see Figs. 4, 5 and 6. The bolt 146 has its screw-threaded portion engaging threads in a bore at the top of the rail 135 so that by turning the bolt the rail may be adjusted up or down with precision for locating the flap-guide 31 beneath the rim of the stitcher-head 10. A relatively narrow strip 149 fastened to the front face of the plate 36 by screws 139 engages a vertical slot in the rail 135 to key the latter to the plate and prevent it from canting.

Staple-clinching means

The flap-guide or support 31 carries a series of clincher-plates 150 for cooperation with the staple-driving means in the stitcher-head 10. The clincher-plates 150 are assembled on, or form a part of, an endless chain 151 having rollers 152 adapted to travel on a trackway 155 which consists of a block-like member having rounded ends and a concaved upper surface. The trackway 155 is secured to the vertical face of the flap-guide 31 by means of bolts 156 passed through a plate 157; the plate 157 and the face of the guide 31 forming guide-rails at the sides of the trackway 155 to retain the clincher-chain 151 in place thereon. The clincher-chain 151 is thus caused to travel around the trackway 155 with the feeding of the carton-blank C and the rotation of the stitcher-head 10. It will be understood that the pressure of the rotating stitcher-head on the carton-blank C maintains the blank in frictional contact with the clincher-plates 150 and thus the feed of the blank causes the chain 151 to travel around the trackway 155 with the ends of the clincher-plates in abutting relationship along the upper course of the chain as shown in Fig. 4 of the drawings. The legs of the staple are thus caused to engage in the longitudinal depressions or grooves in the plates 150, as shown in Fig. 5, to bend the legs toward each other and clinch them against the under side of the blank in accordance with the usual method. In this way the clincher-plates 150 are brought into cooperative relation to the driver-bars 115 as the bars are reciprocated radially outward in the head 10 to drive the staples through the folded flaps of the carton-blank and clinch their legs on the under side of their overlapped portions.

Wire-feeding means

Figure 13:
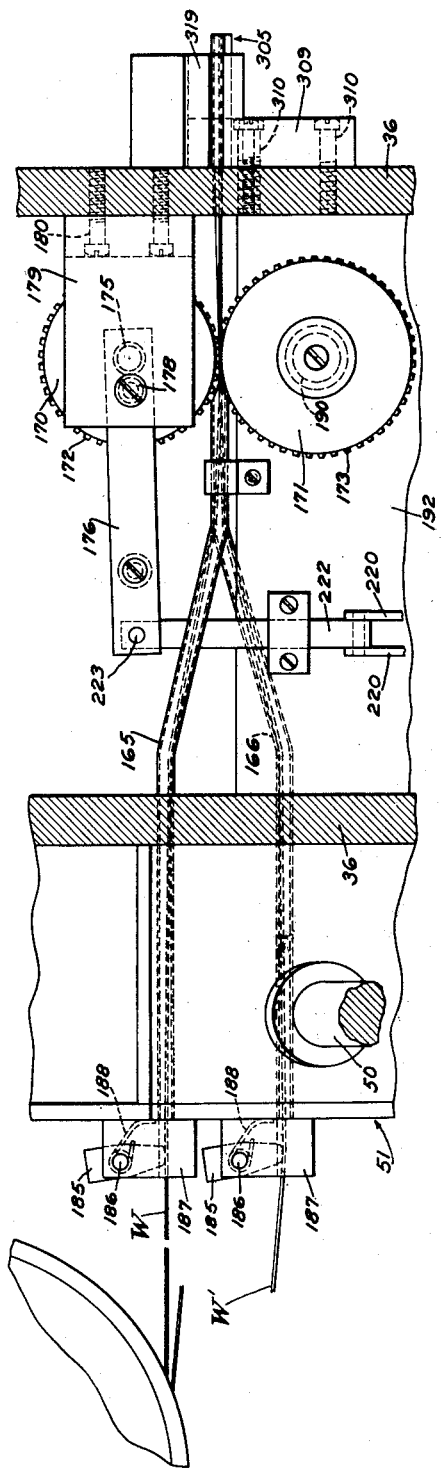
Fig. 13 is an enlarged side elevational view of the wire-feeding means showing the feed-rolls disengaged from the wire strip.

The wire strips W and W' from which the staples are formed are supplied from any suitable source and, as shown in Fig. 17, they are unwound from a pair of spools S rotatably supported by the upper framework of the machine. Conveniently, the spools S may be rotatably mounted on a horizontal shaft or spindle 160 suspended by its ends engaged in hook-like bearings 161 at the lower ends of sheet-metal hangers 162, the upper ends of which are suitably fastened to the angle-iron 12, previously referred to and shown in Fig. 2. Referring to Fig. 13, the wire strips W and W' are unwound from the spools S to draw through tubular conduits 165 and 166 from the ends of which they deliver to opposed feed-rolls 170 and 171 of two different sets or pairs. The purpose of providing two supplies of wire and two feed-mechanisms in the present machine is to insure relatively rapid delivery of the wire to the stitcher-head 10 which rotates at a high rate of speed. As both feeding devices are of substantially the same construction and arrangement it will be sufficient to describe only one in detail, see Figs. 13 and 14. The two feed-mechanisms are spaced at some distance apart as shown in Fig. 18 with the opposed peripheries of the feed-rolls 170 and 171 aligned with the rims of the flanges 110 and 116 on the rotary disk 106, indicated by dotted lines in this latter view.

Figure 14:
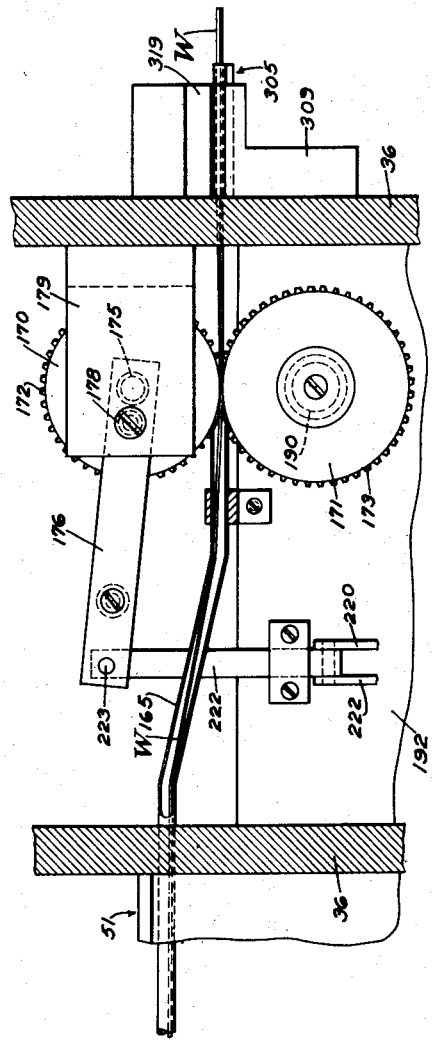
Fig. 14 is a similar view showing the feed-rolls in operative relationship with their peripheries engaging the wire strip.

The two feed-rolls 170 and 171 are mounted on, or formed as a part of spur-gears 172 and 173, respectively, by which they are driven simultaneously and arranged to engage with the wire strip W or W' at their peripheries as it delivers from the end of the tubular conduit 165 or 166, as the case may be. As shown in Figs. 13 and 14, the upper feed-roll 170 is journaled on a spindle 175 which is held in the end of a bifurcated lever 176 pivoted on studs 178 fast in the sides of a bifurcated bracket 179 bolted at 180 to the plate 36. The lower feed-roll 171 of each pair is journaled in fixed position and driven continuously by means later described with its gear 173 meshing with the gear 172 on the upper roll 170. By means of the lever 176 the upper feed-roll 170 may be held raised away from the roll 171 so that the peripheries of the two rolls will be free of the wire W when it is desired to arrest the feeding operation. The means for operating the lever 176 and the connections for driving the gears 172 and 173 for rotating the feed-rolls 170 and 171 are described hereinafter in connection with Figs. 18, 19 and 20 of the present drawings. Means are provided for preventing retrogressive movement of the wires W and W' when the feed-rolls are inoperative, such means being shown in Fig. 13 as comprising pawls 185 pivoted on pins 186 held in blocks 187 fastened to the plate 51, previously mentioned and shown in Fig. 17. Helical springs 188 surrounding the pins 186 tend to rock the pawls 185 to adapt their lower rounded ends to dog against the wires W or W' to check retrogressive movement thereof.

Feed-roll driving means

Figure 18:
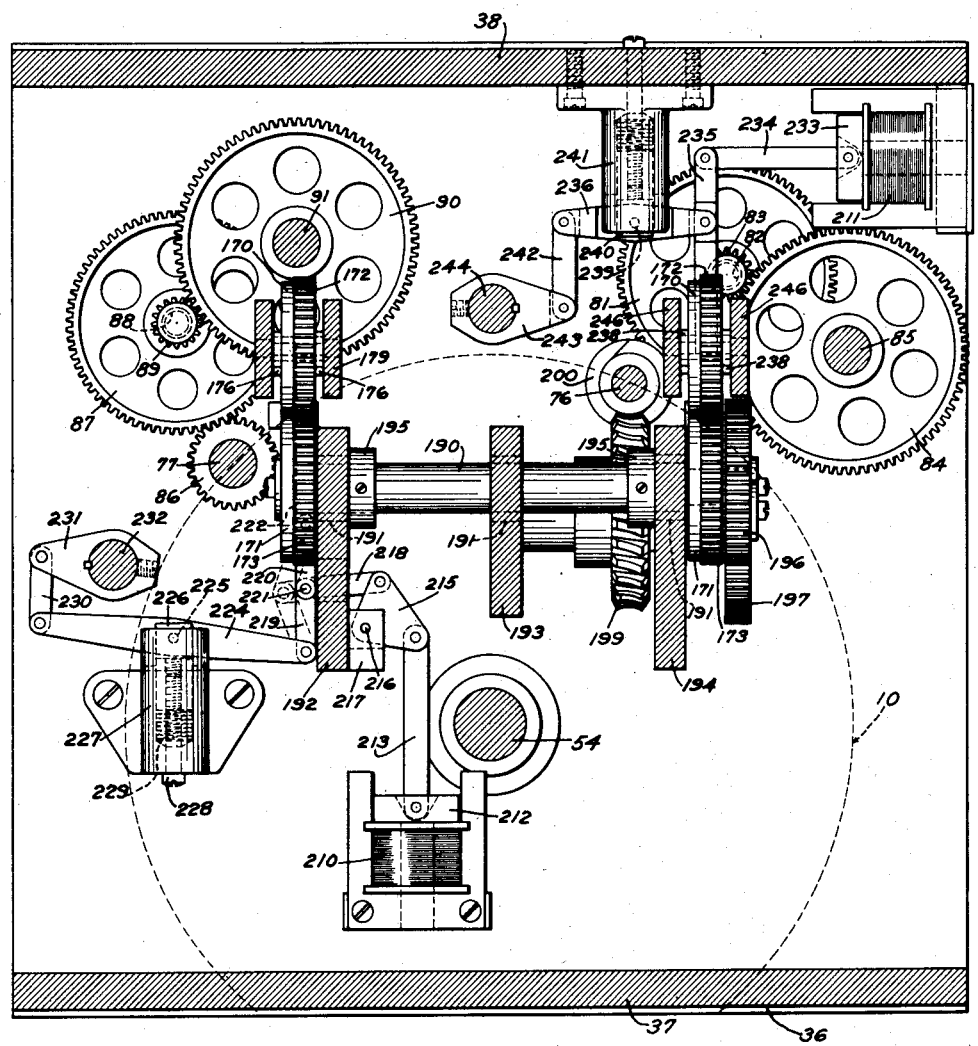
Fig. 18 is a view of the means for automatically controlling the operation of the stitcher-head by arresting the feeding of the wire when the work fails to feed through the machine.

Referring to Fig. 18, the lower feed-rolls 171 of each set with their connected gears 173 are mounted fast on the opposite ends of a horizontal shaft 190 journaled in bushings 191 in arm-like supports 192, 193 and 194 that project rearwardly from the plate 36 of the framework 35. Suitable collars 195 fast on the shaft 190 abut the sides of the arms 192 and 194 to restrain the shaft from axial movement in its bearings. The shaft 190 carries a spur-gear 196 on its right-hand end of a diameter slightly greater than that of the gear 173 on the feed-roll 171. The gear 196 is driven from a still larger gear 197 fast on a transverse shaft 198, see Fig. 19, that also carries a worm-gear 199 fast thereon. The worm-gear 199 is in mesh with a worm 200 on the shaft 76, previously referred to, and shown in Fig. 15 as being driven from the bevel-gear 74 meshing with the gear 72 on the inclined shaft 50. Referring again to Figs. 18 and 19, by means of these connections the shaft 190 is driven to rotate the gears 173 which drive the gears 172 so that both feed-rolls 170 and 171 of each set are driven continuously during the operation of the rotary head 10. It is to be understood that the gear-train for driving the feed-rolls may include "change" gears for varying the drive to adjust the extent of feed of the wire and thereby the length of the blanks severed therefrom to regulate the length of the legs formed on the staples.

Control means for wire-feed

The feed-rolls 170 and 171 are caused to frictionally engage and feed the wires W and W' under the control of instrumentalities next described. The controls for the different pairs or sets of feed-rolls 170 and 171 are separate and independent of each other, being adapted to move the upper feed-rolls toward the lower rolls and advance the wire when a carton-blank is being fed forwardly beneath the rim of the stitcher-head 10. Preferably, a switch, later described, is tripped by the feeding carton-blank to energize two different solenoids 210 and 211 shown in Fig. 18 as suitably mounted on the plate 36. The armature 212 of the solenoid 210 is connected to a link 213 which has its opposite end pivotally connected to a rockable triangular-shaped lever 215 pivoted on a pin 216 in a bearing 217 on the side of the arm or support 192. The upper end of the triangular lever 215 is connected by a link 218 to pairs of similar links 219 and 220 that are pivoted together at 221 to form a toggle-joint. The upper ends of the pair of links 220 are pivotally connected to a link 222 which has its upper end pivoted at 223, see Fig. 13, to the lever 176 for raising and lowering the upper feed-roll 170. The lower ends of the toggle-links 219 are connected to a lever 224, in the nature of a "walking-beam," that is pivoted at 225 in a bifurcated bearing at the end of a plug 226 adapted for vertical adjustment in a cylinder 227 fastened to the plate 36. A screw 228 projecting into the cylinder 227 from the bottom is threaded into a bore in the plug 226 to adapt it to raise or lower the latter and thereby the pivot 225 for the lever 224. A spring 229 in the enlarged bore of the cylinder 227 acts to raise the bearing plug 226 when the screw 228 is unscrewed. The opposite end of the lever 224 is pivotally connected to a link 230 which, in turn, is pivotally connected to an arm or lever 231 keyed to a rockable shaft 232. The shaft 232 carries one of the elements, later described, for controlling the feed of the wire in accordance with the number of staples required by the type of work being performed.

Figure 19:
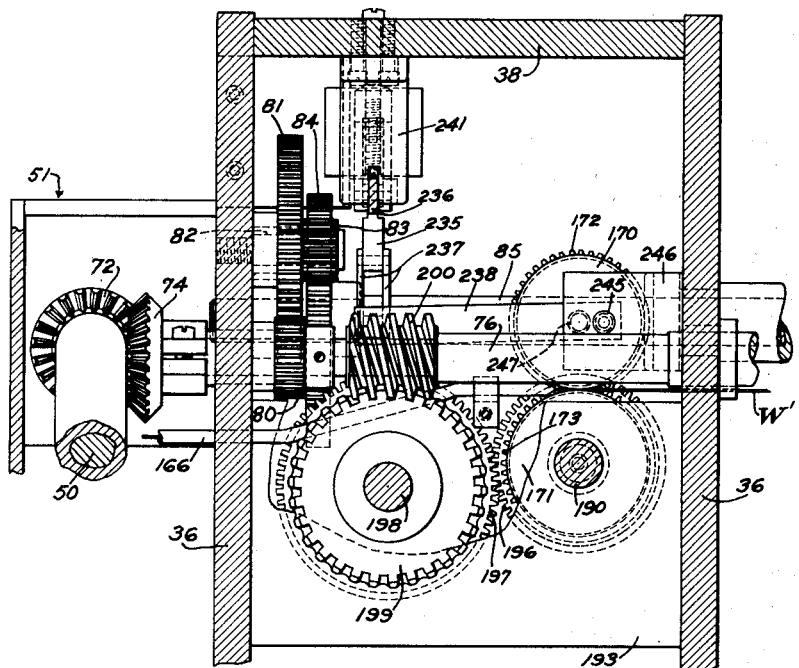
Fig. 19 is a view of the gearing for driving the feed-rolls.
Figure 20:
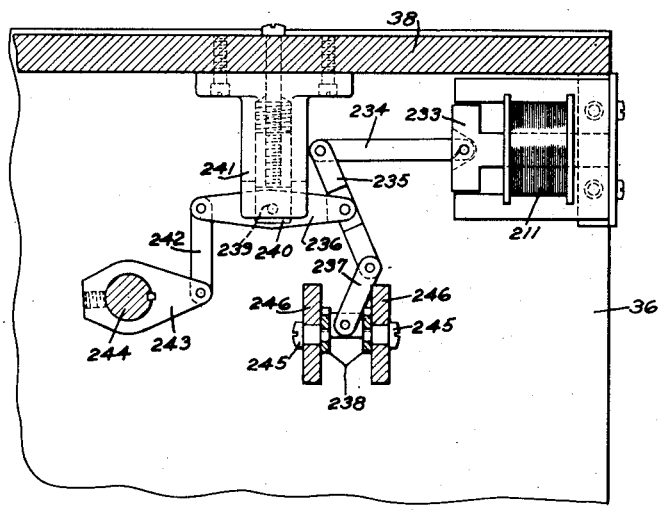
Fig. 20 is a detailed view of the solenoid-operated means for engaging the feed-rolls with the wire and releasing them therefrom.

The feed-rolls 170 and 171 of the other pair are controlled by the solenoid 211 which actuates a system of levers similar to those first above described but having a slightly different arrangement, see Figs. 19 and 20. The armature 233 of the solenoid 211 is connected by a link 234 to a rockable lever 235 that is pivoted to the end of a rocker-arm 236. The lower end of the lever 235 is connected to a pair of links 237, the lower ends of which are pivoted to the end of a double lever 238, see Fig. 19, which operates the upper feed-roll 170 of the second pair shown in this latter view. The rocker-arm 236 is pivoted on a pin 239 held in a plug 240 which is adjustable in a bearing 241, the construction and arrangement being similar to that for mounting the walking-beam 224 in the system first described above. The left-hand end of the rocker-arm 236 is connected by a link 242 to the end of an arm 243 keyed to a shaft 244 similar to the shaft 232.

It should be noted that in the arrangement of the second pair of feed-rolls 170 and 171 the operating lever 238 is pivoted on aligned pins or studs 245 in the sides of the bifurcated bracket 246 with the spindle 247 for the roll 170 at the left thereof. Consequently, the lever 238 for the roll 170 of this set is operated in the opposite direction from the lever 176 for the other set, see Figs. 13 and 14, since the connections are reversed. In other words, clockwise rocking of the lever 176 acts to carry the roll 170 downward towards the roll 171 to grip the wire while the lever 238 for the other set of rolls must be rocked counter-clockwise to carry the roll 170 towards the roll 171.

*Actuating means for wire-feed*

It will thus be observed that the controls for the pairs of feed-rolls 170 and 171 are separate from and independent of each other, being rendered operative through the medium of the solenoids 210 and 211 which are energized by the switch, later described, when closed by the passage of a carton-blank under the rim of the stitcher-head 10. The solenoids have their armatures connected to shift certain of the levers, above described, and this action is under the control, with respect to each set of feed-rolls, of what may be termed "rider-arms" in the form of rocker-levers 250 and 251, see Figs. 3 and 15. The rider-arm 250 is fast on the end of the shaft 232 and the rider-arm 251 fast on the shaft 244, both referred to above in connection with Figs. 18 and 20. At its forward end each rider-arm 250 is provided with a hardened cam-shoe 252 adapted to ride on the peripheries of a series of collars 255 applied to spindles 256 which project from the ends of the studs 117, referred to previously in connection with the showing in Fig. 16. The studs 117 have hexagonal nut-portions 257 and the spindles 256 project axially therefrom, see enlarged view Fig. 9. The collars 255 are releasably held on the spindles 256 with their hubs 258 engaged at the end by small balls 259 projecting from transverse holes 260 in the spindles; the outer rims of the holes 260 being peened over to prevent the balls from escaping and the balls being projected slightly beyond the ends of the holes by helical springs 261 therein. This arrangement provides for convenience in manually mounting the collars 255 on the spindles 256 by simply sliding them into place as the balls 259 are withdrawn into the ends of the holes 260.

*Means for operating rider-arms*

It will be observed by reference to Fig. 3 that a large number of studs 117 are provided on the rotary disk 106, being arranged circumferentially of the annular flange 110 and closely spaced therearound. The studs 117 pass through the annulus 110 to the annulus 116 between adjacent driver-bars 115 of the assembly and are held in place by their nut-portions 257 set up against the annulus 110. Any number of collars 255 may be mounted around the annulus 110 on the disk 106 to regulate the range of operation of the stitcher-head 10, that is, as regards the number of staples to be applied and their spaced relationship for any particular type of work. Usually, however, the collars 255 are arranged in groups to progressively actuate the rider-arms 250 and 251 as the disk 106 rotates clockwise whereby to feed the different wires W and W' to any predetermined number of slots in the rim of the disk to be formed into the required number of staples and driven into the work in the manner later explained. The stitcher-head 10 is thus adapted to apply the staples in groups; for example, two series of seven staples each, when the arrangement of the collars is as shown in Fig. 3 with both feeds employed; the method of selectively applying various numbers of staples with different spacing therebetween being explained more fully hereinafter. Suffice it to state here that the arrangement is susceptible of numerous variations whereby staples may be applied to the work singly or in series of varying number at different distances apart with a wide range of selection.

Figures 8, 9, 10:
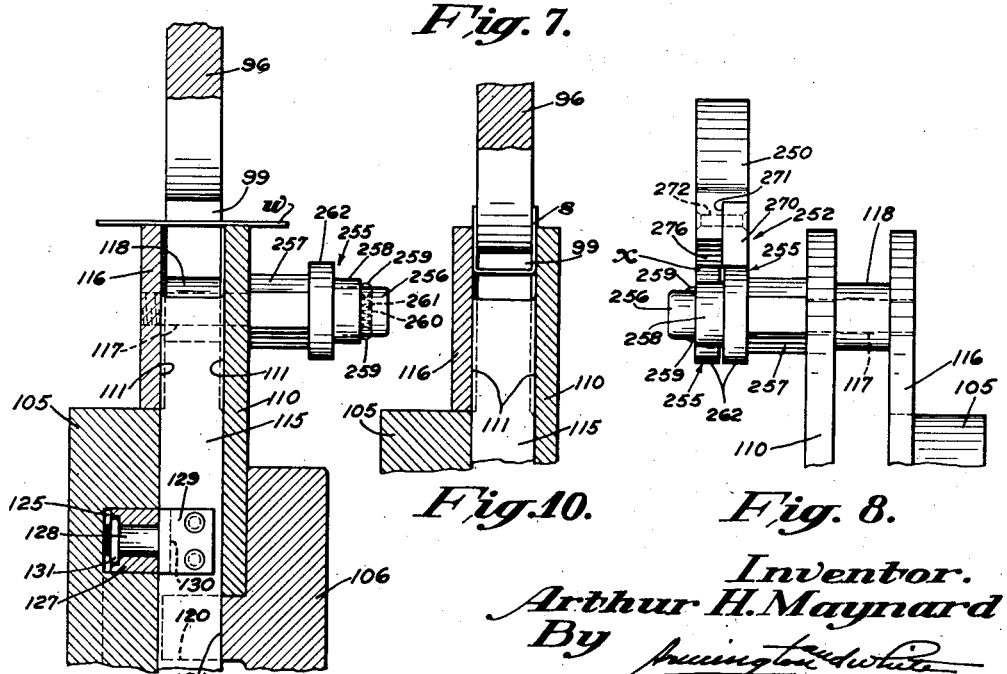
Fig. 8 is a detailed view of one of the arms for operating the wire-feeding means looking toward its free end and showing the shape of the shoe at this end.
Fig. 9 is a sectional view of a portion of the rotary head showing the staple-former as about to operate on a length of wire to bend it into a staple.
Fig. 10 is a similar view showing the former as having completed the formation of a staple.

Referring to Figs. 8 and 9, the collars 255 are of cylindrical form with portions of different diameter, one portion 258 being in the nature of a hub with a flange-like extension 262 projecting radially therefrom. The peripheries of these flanged portions 262 on the collars 255 act as rollers for engaging with the cam-shoes 252 on the rider-arms 250 and 251 in accordance with the order in which the collars are placed on the spindles 256. It will be noted by reference to Fig. 15 that the two rider-arms 250 and 251 are offset laterally, one from the other, with the arm 250 located at a greater distance from the side of the disk 106 than the arm 251. It will be observed further that the nut-portions 257 of the two sets of studs 117 are of different thickness so that the spindles 256 project at different distances from the side of the disk 106.

This axial displacement or offsetting of the different spindles 256 relative to each other provides that the collars 255 may be so placed thereon that certain of them will contact with the cam-shoe 252 on the rider-arm 250 while certain others will contact with the cam-shoe on the arm 251 during rotation of the disk 106. By thus arranging the spindles 256 in alternate order around the disk 106, that is, with first a long one and then a short one, relatively speaking, the collars may be applied thereto with the same alternate arrangement so that their flanges will engage alternately with the cam-shoes on the different rider-arms 250 and 251.

Referring to Fig. 8, the shoes 252 of both rider-arms 250 and 251 are of substantially twice the width of the flanges 262 on the collars 255 so that when the latter are arranged with their flanges disposed inwardly toward the side of the annulus 10, as shown in Fig. 9, only one-half the width of the shoes 252 will engage across the peripheries of the flanges on the collars. The reason for this construction is to provide for reversing certain of the collars 255 in position to adapt their flanges 262 for engagement with the opposite half of the shoes 252 for a purpose later explained.

Figure 7:
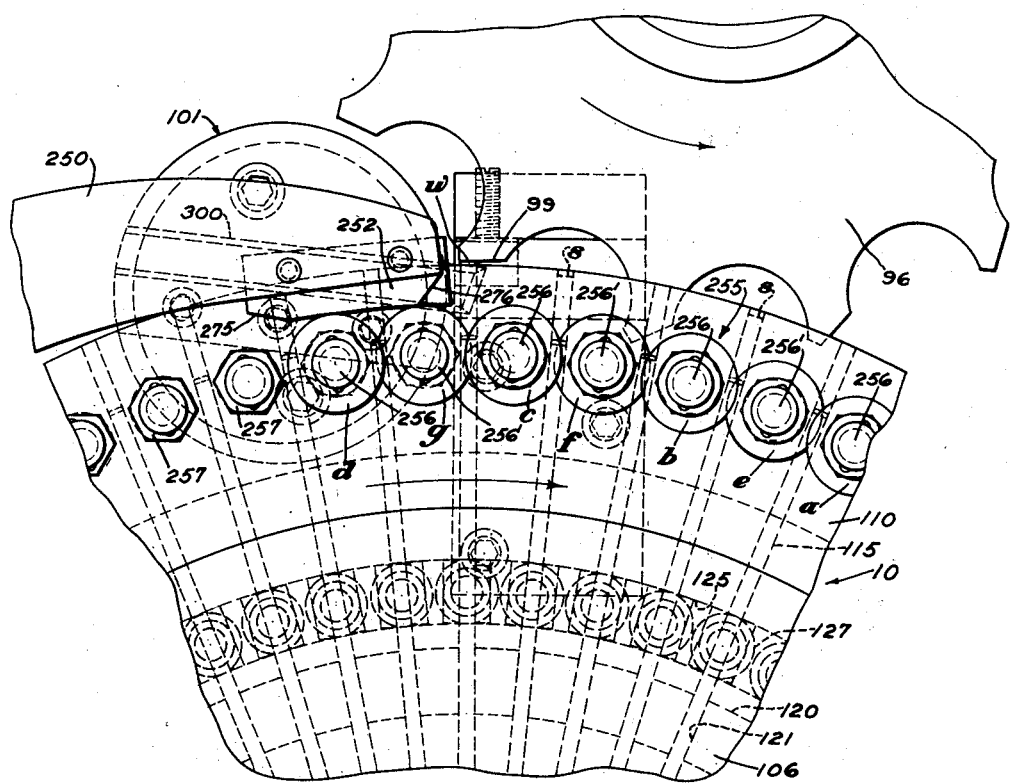
Fig. 7 is a fragmentary side view of the stitcher-head showing one of the arms for initiating the operation of the wire-feeding means and the means for forming staples from severed lengths of the wire.

Fig. 8 shows the rider-arm 250 in end view with its shoe 252 attached thereto and having a peculiar shape on its under side. The shoe 252 has a flange-like portion 270 at the top let into a rabbet-like recess 271 in the rearward side of the arm 250 with rivets 272 fastening it thereto. Referring to Figs. 7 and 8, the left-hand portion of the shoe 252 is offset from the flanged portion 270 to position it for engagement with the flange 262 on a collar 255 when said collar is reversed in position as shown at x in Fig. 8 with its flange 262 disposed outwardly toward the end of the spindle 256. The rearward end of each shoe 252 is formed across its width with a bevel at 275 to adapt it to ride up easily onto the peripheries of the flanges 262 on the collars 255 while its opposite or forward end is more sharply beveled at 276, but only across the end of the offset portion of the shoe. This last-described bevel 276 is provided to insure that the cam-shoe 252 will be disengaged promptly from the periphery of the flange 262 on the last collar 255 in each series during rotation of the disk 106, so that immediately a length is cut from the wire strip for forming a staple the rider-arm will drop quickly and not be held to cause the severing of a waste length of wire before the feed is arrested.

It should be explained that both arms 250 and 251 normally have their forward ends depressed, that is, they are rocked downwardly by means of springs acting on their shafts 232 and 244, respectively, whenever the collars 255 are disengaged from the cam-shoes 252. Referring to Fig. 3, the shaft 232 carries a short arm 278 fast thereon and projecting from its side and the shaft 244 carries a similar arm 279 fast thereon. Pivotally connected to lugs 280 and 281 on the arms 278 and 279 are screws 282 and 283 which are slidable through holes or slots 284 in stationary lugs 285 and 286 projecting from the rearward side of the plate 36. Springs 287 and 288 tensioned between lugs 280 and 285 and lugs 281 and 286, respectively, act to rock the arms 278 and 279 to oscillate the shafts 232 and 244 and thereby swing the rider-arms 250 and 251 downwardly or in clockwise direction. To the screws 282 and 283 carry washers 289 under their heads which engage with the side of the stationary lugs 280 and 285 to limit this latter rocking motion of the arms 250 and 251 as the screws are drawn through the holes in the lugs. As the collars 255 engage with the cam-shoes 252 on the arms 250 and 251 during rotation of the disk 106, the rider-arms are swung upwardly against the tension of the springs 287 and 288.

Wire-cutters

Figure 11:
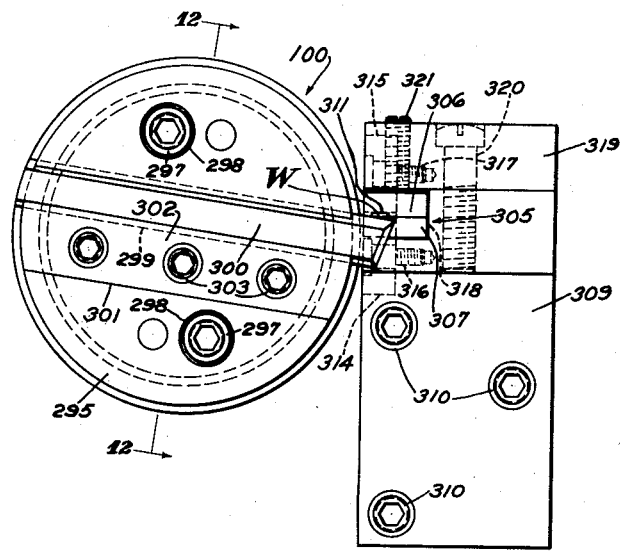
Fig. 11 is an enlarged detailed view of the wire-cutter and its associated elements for severing lengths from the strip fed to the machine.
Figure 12:
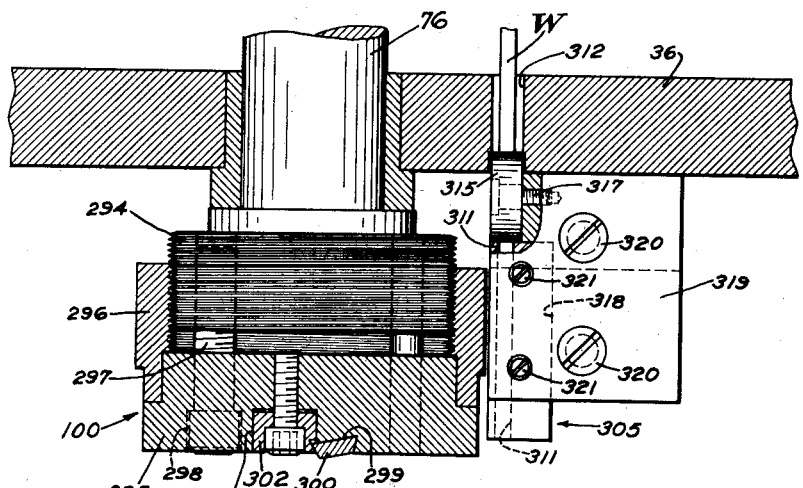
Fig. 12 is a vertical sectional view of the wire-cutter head taken on line 12—12 of Fig. 11 and showing the means for fastening the cutter-blade therein.

It has been explained that the strips of wire, which may be of either flat or round cross-section, are severed into predetermined lengths to be formed into staples and the cutting action takes place each time the wire is fed forward by the feed-rolls 170 and 171. The two wire-cutters 100 and 101, previously referred to as mounted on the shafts 76 and 77, are identical in construction and arrangement and therefore only one will be described in detail. Referring to Figs. 11 and 12, each wire-cutter comprises a threaded hub 294 mounted fast on its respective shaft 76 or 77 and carrying a cylindrical head 295 having an interiorly-threaded flange 296 screwed onto the hub. Screws 297 extend through the head 295 with their shanks screwed into the hub 294 to secure the head in adjusted position at the end of each shaft, the socketed heads of the screws being received in counterbores 298 in the head. The cutter-head 295 is formed with an undercut bevel-sided slot 299 extending substantially diametrically across its face and adapted to receive a cutter or knife-blade 300. A second rectangular slot 301 extending across the face of the head 295 at the side of the first slot 299 is adapted to receive a key or spline 302 formed with a notch in its edge for engaging one edge of the knife-blade 300 to fixedly secure the blade in place. Suitable socket-head bolts 303 fasten the key 302 in place to bind the knife-blade 300 in its slot 299.

Referring to Fig. 11, the end of the knife-blade 300 projects from the side of the cutter-head 295 for cooperation with a fixed anvil 305 which holds the wire strip W or W' while it is being severed into relatively short lengths. The anvil 305 comprises two opposed hardened strips or blocks 306 and 307 held in a stationary bearing 309 fastened to the side of the plate 36 by bolts 310. One of the anvil-strips 306 is formed with a longitudinal slot 311, preferably conforming to the shape of the wire W, which is herein represented as in the form of a flat strip; it being understood that any other suitably shaped wire may be used in the machine, either round, oval or hexagonal in cross-section. The wire strip W feeds through an opening 312 in the side plates 36 of the framework 35 and thence between a pair of rollers 314 and 315 mounted on studs 316 and 317 held in the bearing 309. The anvil-strips 306 and 307 are held in a side recess 318 in the bearing 309 by means of a cap 319 overlying the bearing and secured thereto by screws 320. A pair of set-screws 321 threaded through the cap 319 bear against the upper anvil-strip 306 to clamp the two strips together and fasten them in place in the recess 318 of the bearing 309. The strip of wire W or W' is thus arranged to feed between the rollers 314 and 315 to guide it into the slot 311 in the anvil 305, whence it emerges from the end of the anvil to be cut into predetermined lengths by the knife-blade 300 during continuous rotation of the cutter-head 295.

Electric switch for controlling operation of machine

It has been stated that the feed-rolls 170 and 171 are rotated continuously but are caused to feed the wire only when carton-blanks or other work is being fed through the machine; the solenoids 210 and 211 being energized by means of a normally open electrical circuit adapted to be closed by a switch actuated by the feeding blanks. Any conventional type of switch may be employed for this purpose and, as represented in Fig. 1, the switch 325 may be of the plunger type located on the table 2 in the path of the feeding blanks. The switch 325 may comprise a box or casing 326 supported from the guide 23, see Fig. 2, with its plunger 327 projecting downwardly. A flat leaf-spring 330 fastened to the top of the switch-box 326 extends rearwardly therefrom in a loop with its free end projecting forwardly beneath the end of the plunger 327. As the carton-blanks C feed forwardly to the stitcher-head 10 they ride under the free length of the spring 330 to raise the latter and thereby slide the plunger 327 upwardly to close the contacts of the switch 325. In this way the solenoids are maintained substantially continuously energized during passage of the work beneath the stitcher-head 10 so that the staples may be applied thereto very rapidly and continuously. Since the circuit from the switch to the solenoids is of simple arrangement, one branch being closed and the other normally open at the switch, with the current supplied from any suitable source such as the lighting circuit, it is considered unnecessary to illustrate the wiring by diagram. The operating mechanisms of the complete apparatus having been described in detail the method of operation of the machine is explained as follows:

*Method of operation of the complete apparatus*

To prepare the machine for operation a predetermined number of collars or cam-rollers 255 are applied to the spindles 256 on the rotary disk 106 for actuating the rider-arms 250 and 251 to feed the wire in accordance with the character of the work to be performed. As shown in Fig. 7, the collars 255 may be arranged in two groups, the first group comprising four collars a, b, c, and d, which are placed on the outermost spindles 256 with three additional collars e, f and g disposed in alternate relation thereto on the innermost spindles 256'. The second group of collars 255, shown in Fig. 3, may have a similar alternate arrangement with four collars h, i, j and k, applied to the inner spindles 256' and three collars l, m and n disposed in alternate relation thereto separating the collars h, i, j and k. Such a selective arrangement and grouping of the collars, illustrated herein by way of example, adapts the machine to stitch the folded flaps of conventional type carton-blanks in a manner as later explained.

The machine is started to operate by closing a switch in the circuit to the motor 45 which drives the blank-feeding chains 25 and also operates the various mechanisms of the stitcher-head 10. Referring to Fig. 2, the pulley 47 on the armature of the motor 45 drives through the belt 48 to rotate the pulley 49 and drive the shaft 50, see Fig. 17. The shaft 50 drives through the worm 52 and worm-gear 53 to rotate the shaft 54, which may be considered the main shaft of the stitcher-head 10 since it carries the rotary disk 106 at its end. The disk 106 is rotated continuously and during its clockwise rotation, as viewed in Figs. 3 and 7, the cam-groove 125 in the fixed disk 105 acts on the followers or rollers 127 to reciprocate the driver-bars 115 in the slots 111 of the flanges 110 and 116 on the disk. During the rotation of the disk 106 the driver-bars 115 are projected radially outward as they approach the work beneath the rim of the disk, this action taking place as the rollers 127 follow the inclined portion 126 of the cam-groove 125. Thereafter, as the disk 106 continues to turn, the eccentric portion of the cam-groove 125 causes the driver-bars 115 to be withdrawn radially inward towards the axis of the disk until they again enter the inclined portion 126 of the cam-groove to be once more projected outwardly toward the rim of the disk.

The shaft 54 is connected through the jointed shafts 57 and 60 to drive the gear 65, see Fig. 2, and this latter gear drives through the train of gears 66, 68 and 70 to rotate the shaft 71 carrying the sprockets 26 and 27 for the blank-feeding chains 25. The carton-blanks C are placed on the table 2 resting on the longitudinally-extending strips 9, being guided at the sides by the adjustable guides 23 and 24 and fed forwardly by the dogs 30 on the chains 25. Referring to Figs. 4, 5 and 6, which illustrate a carton-blank C as being fed through the machine, the blank passes beneath the rim of the rotary disk 106 in contact with the clincher-chain 151 and engages with its clincher-elements 150 to advance the latter concurrently with the rotation of the disk 106. As the blank C is thus fed forwardly its flaps f, f are caused to ride along the top of the guiding means 31 to overlap their foremost edges, as shown in Fig. 5, and position them for driving the staples therethrough. A continuous series of blanks may thus be fed through the machine and their flaps stitched together without pause in the rotation and operation of the stitcher-head. It has been explained that as the blanks C pass under the electric switch 325 the spring 330 is raised to close the electric contacts and energize the circuit to the solenoids 210 and 211, whereby to shift the linkages, shown in Figs. 18 and 20, for controlling the operation of the feed-rolls 170 and 171.

Upon energization of the solenoid 210, see Fig. 18, its armature 212 will draw the link 213 downwardly and thereby rock the lever 215 for aligning the links 219 and 220 to close the toggle-joint which is connected at one end to the link 222 and at the other end to the lever 224. The link 222 is connected to the lever 176, see Fig. 16, which is pivoted at 178 and carries the feed-roll 170 on its shorter arm as shown in Fig. 13. Normally, with the solenoid 210 de-energized and its armature 212 projected outwardly the toggle-joint will be open, as indicated by the dotted lines in Fig. 18, with the lever 176 in position to maintain the feed-roll 170 lifted slightly and substantially free from contact with the wire strip W as shown in Fig. 13. With the rider-arm 250 swung downwardly under the tension of the spring 287 the walking-beam 224 will be in such position that no effort is exerted on the lever 176 to carry the feed-roll 170 down and cause it to frictionally grip the wire strip W between it and the lower roll 171. Therefore, it is only when the rider-arm 250 is rocked upwardly against the tension of its spring 287 by the collars 255 making contact with its cam-shoe 252 that the arm 231 on the shaft 232 will be rocked counterclockwise. When this occurs the walking-beam 224 is rocked in the same direction, that is counter-clockwise, to cause it to act through the closed toggle and force the link 222 upwardly. This action rocks the lever 176 clockwise, thereby forcing the feed-roll 170 into frictional engagement with the wire strip W, as shown in Fig. 14, and causing it to be fed forwardly through the anvil 305, Fig. 12. As the wire strip W is fed forwardly and its end projected beyond the end of the anvil 305, the cutter-blade 300 comes into action to sever a relatively short length or blank w from the strip. It has been previously explained that the cutter-heads 100 and 101 are rotated continuously and their operation timed in synchrony with the feeding of the wire strip so that a predetermined length may be severed therefrom for forming into a staple.

The method of operation of the other set or pair of feed-rolls 170 and 171 is substantially the same as that explained above, the only difference being in the arrangement of the lever connections shown in Figs. 19 and 20. Briefly stated, when the solenoid 211 is energized it draws the link 234 to the right to close the toggle-joint between the lever 235 and link 237, thereby adjusting the parts for operation of the feed-rolls. Then when the arm 243 is rocked counter-clockwise by the lifting of the rider-arm 251 due to its engagement with the collars or rollers 255 on the innermost spindles 256', the feed-rolls 170 and 171 will be activated. The lever 238 carrying the upper feed-roll 170 is rocked counter-clockwise to lower the feed-roll 170 into frictional engagement with the wire strip W' to cause it to feed into position for severing a length therefrom by the action of the cutter head 101, see Fig. 3. A series of blanks $w$ will then be applied to the rotary disk 106 at other points for the staple-former 95 to bend into staples in the same way as previously explained above.

It will be understood that the rider-arm 250 is maintained in its raised position as long as the collars 255 on the longer spindles 256 are engaged with its shoe 252 during clockwise rotation of the disk 106; and likewise the same action takes place with respect to the rider-arm 251 as the collars 255 on the shorter spindles 256' engage with the shoe 252 on this arm. The feed of each wire strip W or W' is therefore continuous during the traverse of the collars 255 along the under side of the shoe 252 on each arm 250 or 251 and the wire-cutters 100 and 101 operate intermittently to sever predetermined lengths $w$ from both strips. At timed intervals the severed lengths of wire are applied to the rim of the disk 106 projecting across the peripheries of the flanges 110 and 116 in the manner illustrated in Fig. 9. Immediately upon the severing of each staple blank $w$ a cam-shaped tooth 99 on the staple-former 95 comes into contact with the blank intermediate its ends to bend it into a U-shaped staple $s$ and force it down into the slots 111 in the opening between the flanges 110 and 116 on the disk 106 as shown in Fig. 10. As the staples are thus formed in the space between the flanges 110 and 116 their legs will engage frictionally therewith and be positioned beyond the ends of the driver-bars 115 which are withdrawn into retracted relationship as shown at the top of Fig. 3. During this sequence of operations staples may be formed and applied to the ends of the slots 111 in the flanges 110 and 116 in any suitable number and according to any predetermined spacing. It will be understood that the forward group of collars 255 on the disk 106 will engage first with the shoe 252 on the rider-arm 250 and thereafter with the shoe 252 on the arm 251, only those collars placed on the outermost spindles 256 acting on the arm 250 and only those on the innermost spindles 256' cooperating with the arm 251. Stated more specifically, and referring to Fig. 7, the collars designated $a$, $b$, $c$, $d$ traverse the under side of the cam-shoe 252 on the rider-arm 250 in the order named, while the collars $e$, $f$, $g$ on the innermost spindles 256' traverse the cam-shoe 252 on the rider-arm 251; it being noted that since the disk 106 rotates clockwise the collars $l$, $m$, $n$ in the right-hand group, as viewed in Fig. 3, will be the first to act on the rider-arm 250, whereas the corresponding collars $h$, $i$, $j$, $k$ of this same group will be the first to act on the rider-arm 251.

It will be understood that while the solenoids 210 and 211 are de-energized the arm 250 or 251 may have its cam-shoe 252 traversed by the collars 255, but in such case the arms will merely rise and fall without causing action of the feed-rolls 170 and 171 as the toggle-joints in their lever connections remain broken so that no pressure is exerted on the lever 176 or 238. As has been stated, most of the collars 255 are placed on the spindles 256 with their flanges 262 disposed inwardly toward the side of the flange 110, see Fig. 9, so they operate on the inner half of the shoe 252 on either arm 250 or 251. However, in order that the last collar in the group which actuates the arm 250, for example that designated $d$ in Fig. 7, may release the arm 250 promptly after a staple blank has been severed from the strip, and not continue its action to cut off a waste length of wire, this last collar is arranged with its flange 262 disposed outwardly away from the flange 110 on the disk 106 as indicated at $x$ in Fig. 8. This provides that the flange 256 on the collar so reversed in position will ride on the outermost side of the shoe 252 which has the sharp bevel 276 at its right-hand end to thereby release the arm 250 immediately. The last collar $n$ in the first group or series is also placed in the same way with its flange 262 disposed outwardly away from the flange 110 so that it will act in the same way for quick release from the cam-shoe 252 on the arm 251. Likewise, the collars $g$ and $k$ in the groups are reversed in position for the same purpose.

As the slots 111 in the flanges 110 and 116 on the rim of the rotary disk 106 are supplied with formed staples $s$, for example in groups of any certain number, the staples are carried down toward the work as the drivers 115 are reciprocated to force them outwardly in the manner indicated in Fig. 3; the guard-member 133 having its tapering portion located between the flanges 110 and 116 to insure that the staples will not drop out of the slots 111. As each driver-bar 115 reaches a point in the vertical plane of the axis of the disk 106 it is projected downwardly sufficiently to drive the staple out of the slots 111 in the flanges 110 and 116 on the disk 106 to force it through the work with its legs impinging on the clinching-elements 150 to bend them over and clinch them on the under side of the work. Thus, as each staple approaches the vertical plane referred to it is driven into the work; for example, through the overlapped flaps $f$, $f$ of a carton-blank C as shown in Fig. 5, any number of staples being applied to the work in this way according to the type of work being processed in the machine. For example, for smaller types of carton-blanks only one staple may be applied adjacent each outer marginal edge of the folded flaps; whereas, for larger blanks a larger number of staples are inserted in spaced relationship across the folded width of the flaps. In this way the machine may be operated continuously as long as work is fed to the stitcher-head 10 and the staples will be applied thereto very rapidly without interruption at a speed never before attained with ordinary stapling appliances.

With an arrangement of the collars 255 such as shown in Figs. 3 and 7, the machine may be caused to apply two groups of seven staples each in the flaps of a carton-blank with the staples spaced three-quarters of an inch apart in each group and a space of one-and-one-half inches between the groups; this being of course only one particular arrangement as the machine is quite versatile in operation as regards the number and spacing of the staples.

It is to be understood that the above explained method of preparing the machine for operation and its method of functioning is by way of example only since other ways of applying the collars or cam-rollers to the spindles on the rotary disk 106 may be employed and likewise the machine may be rendered operative for performing types of work other than that herein indicated. Furthermore, changes may be made in the construction and arrangement of the parts of the stitcher-head and its cooperating appurtenances without departing from the scope of the invention. Therefore, without limiting myself in this respect, I claim:

1. In a machine of the type indicated, a cylindrical head having a plurality of radial slots closely spaced around the entire circumference of said head, means to simultaneously feed a plurality of wire blanks across the periphery of the head to register them with a plurality of said slots, means cooperating with the head during its rotation to form the wire blanks into staples, and means reciprocable in the slots of the head to drive the staples outwardly therefrom and apply them to the work fed beneath the head.

2. In a machine of the type indicated, a cylindrical stitcher-head having a plurality of radial slots opening through the rim of the head in closely spaced relation around the entire circumference of said head, a plurality of means for feeding wire across the periphery of the head at different locations therearound in register with the ends of said slots, means for severing the wire into predetermined lengths, a plurality of rotary forming members having means for entering the slots in the head for forming the wire lengths into staples, and driving means in the slots of the heads for driving the staples out therefrom to apply them to the work fed beneath the rim of the head.

3. In a machine of the type indicated, a rotary stitcher-head comprising a disk having a plurality of radial slots in its face, a second stationary disk disposed in spaced relation to the rotary disk, said stationary disk formed with a cam-groove in its side opposed to the rotary disk, means for feeding lengths of wire across the ends of the slots in the rotary disk, means for forming said wire lengths into staples, driver-bars reciprocable in the slots in the rotary disk, and means on said driver-bars engaging the cam-slot in the stationary disk for reciprocating the driver-bars to drive the staples out from the rim of the disk and apply them to the work therebeneath.

4. In a machine of the type indicated, a rotary stitcher-head comprising a disk formed with radial slots in its face, means for rotating said disk, a fixed plate mounted in opposite parallel relation to the rotary disk, a cam-groove in the fixed plate overlying the face of the rotary disk, a plurality of driver-bars slidably mounted in the slots in said rotary disk, a follower on each driver-bar engaging the cam-groove in the fixed plate for reciprocating the driver-bars in the slots, means to feed wire across the rim of the rotary disk in register with the ends of the slots therein, means for severing the wire into predetermined lengths, and means for forming the wire lengths into staples held in the slots in the rotary disk to adapt them to be driven by the reciprocation of the driver-bars to apply them to the work in series during continuous rotation of the stitcher-head.

5. In a machine of the type indicated, a cylindrical head having a plurality of radial slots open at its periphery, means to rotate said head, means for applying lengths of wire across the periphery of the head in register with the ends of the slots therein, a rotary staple-former having teeth shaped to enter the ends of the slots in the head and engage the lengths of wire to form them into staples inserted in the slots, means for rotating the staple-former, driver-bars reciprocable in the slots in the head, and means for reciprocating said driver-bars to drive the formed staples out of the slots and into the work fed beneath the periphery of the head.

6. In a machine of the type indicated, a cylindrical stitcher-head, means for rotating said head about its axis, a plurality of slots in the face of the head disposed radially thereof and open at the rim of the head, means for feeding wire across the rim of the head in register with the ends of the slots therein, cutters for severing the wire into relatively short lengths, means for operating the wire-feeding means, means for operating the cutters, staple-forming means adjacent the upper rim of the stitcher-head adapted to enter the slots to bend the severed wire lengths into staples, means reciprocable in the slots to drive the formed staples out from the under rim of the head to apply them to the work, and means for continuously actuating the staple-driving means during rotation of the head.

7. In a machine of the type indicated, a stitcher-head comprising a circular disk having radial slots in its face, means for rotating said disk about its axis, a second stationary disk overlying the face of the rotary disk in parallel relation thereto, an eccentric cam-groove in the face of the stationary disk opposite the rotary disk, an annular flange projecting from the rim of the rotary disk, a second flange connected to the first flange in parallel spaced relation thereto and surrounding the rim of the stationary disk, driver-bars slidable in the radial slots in the rotary disk, followers on said driver-bars engaging the cam-groove in the stationary disk, means to feed wire across the rim of the rotary disk in register with the slots therein, means for severing the wire into relatively short lengths, and means for forming said wire lengths into staples held in the ends of the slots of the rotary disk to adapt them to be driven therefrom by the driver-bars as they approach the work fed beneath the lower rim of the disk.

8. In a machine of the type indicated, a rotary stitcher-head having radial slots in its face, means for continuously rotating said head, driver-bars reciprocable in said slots, means for feeding wire across the periphery of the rotary head, a rotary cutter carrying a knife-blade for severing the wire into predetermined lengths, means to rotate the cutter, means for forcing said wire lengths into the slots in the head to form staples therefrom, and means for reciprocating the driver-bars to drive the staples out of the slots in the head to apply them to the work feeding beneath the rim of the head.

9. In a machine of the type indicated, a cylindrical head having radial slots in its face, means to rotate said head about its axis, means for feeding a continuous length of wire across the periphery of the head in register with the ends of the slots therein, means for severing the wire into predetermined lengths, means for forming the severed wire lengths into staples inserted in the slots in the head, a rockable arm for actuating the wire-feeding means, means adjustable around the rim of the head for engagement with the rockable arm to actuate the wire-feeding means in accordance with requirements for forming varying numbers of staples in the head, and means for driving the staples out from the slots in the head to apply them in sequential order to the work.

10. In a machine of the type indicated, a rotary stitcher-head having radial slots, means to rotate said head about its axis, means for feeding wire across the periphery of the head in register with the ends of said slots, means for forming the wire into staples inserted in said slots, means for operating said feeding means, means for controlling the operation of said feeding means including a rockable arm, means selectively attachable to the stitcher-head for actuating the rockable arm to maintain the wire-feeding means operative for forming a predetermined number of staples in the head, and means for driving the staples out from the slots in the head to apply them to the work.

11. In a machine of the type indicated, a cylindrical stitcher-head having radial slots, means to rotate said head about its axis, means for feeding wire across the periphery of the head in register with the ends of the slots therein, means for severing the wire into predetermined lengths, means for forming the severed wire lengths into staples inserted in the slots in the head, a rockable arm for actuating the wire-feeding means, contact elements adapted for attachment to said stitcher-head to cause them to engage and operate the rockable arm to continuously feed the wire to the head in sufficient supply to form a predetermined number of staples, and means to drive the formed staples from the head to apply them to the work.

12. In a machine of the type indicated, a framework, a circular plate fixedly mounted on said framework, a disk rotatably mounted on the framework in parallel spaced relation to the circular plate and formed with radial slots in its face, said disk mounted on a shaft journaled in the framework, means for driving said shaft to rotate said disk, means for feeding wire across the rim of the rotary disk, means for severing the wire into measured lengths in register with the ends of the slots in the disk, means for forming the wire lengths into staples and inserting them in the ends of the slots in the disk, an arm overlying the rim of the rotary disk, means connecting said arm to actuate the wire-feeding means, a plurality of spindles projecting from the face of the rotary disk, collars adapted to be mounted on said spindles for engagement with said arm to oscillate the latter to actuate the wire-feeding means, and means for driving the staples out from the slots in the disk to apply them to the work.

13. In a machine of the type indicated, a cylindrical stitcher-head having a plurality of radial slots open at its periphery, means to rotate said head, means for applying lengths of wire across the periphery of the head in register with the ends of the slots therein, a rotary staple-former having radially projecting teeth adapted to enter the ends of the slots in the head and wipe across the lengths of wire to force them into the slots and form them into U-shaped staples, means for rotating the staple-former in synchrony with the rotation of the head, and means operative for driving the formed staples out of the slots and into the work fed beneath the periphery of the head.

14. In a machine of the type indicated, a cylindrical head having a plurality of radial slots open at its periphery, means to rotate said head, a plurality of means for feeding lengths of wire across the periphery of the head at different locations therearound to register them with the ends of the slots, a plurality of rotary staple-formers located at different stations around the head and having means adapted to enter the ends of the slots in the head and form the lengths of wire into staples held within the slots, means for rotating the staple-formers, and means in the head for driving the formed staples out of the slots and into the work fed beneath the periphery of the head.

15. In a machine of the type indicated, a cylindrical head having a plurality of radial slots closely spaced around its entire periphery, means to rotate said head, means located at different stations around the circumference of the head for feeding lengths of wire across the ends of the slots in said head, a plurality of rotary members located at different stations around the periphery of the head and having means for forcing the lengths of wire into said slots to form them into staples, means for rotating said members, and means for driving the formed staples out of the slots and into the work fed beneath the periphery of the head.

16. In a machine of the type indicated, a cylindrical head having a plurality of radial slots open at its periphery, means to rotate said head, a plurality of wire-feeding means located at different stations around the periphery of the head and adapted to apply lengths of wire across the slots therein, a plurality of staple-formers operative to bend the lengths of wire into U-shaped staples held in the slots in the head, means for driving the formed staples out of the slots and into the work, manually adjustable means for regulating the action of the wire-feeding means to control the number of staples formed in the slots in the head, and means for driving the formed staples out of the head and into the work fed therebeneath.

17. In a machine of the type indicated, a cylindrical head having a plurality of radial slots open at its rim, means to rotate said head about its axis, means for feeding lengths of wire across the periphery of the head in register with the ends of the slots therein, means for forming the severed wire lengths into staples held in the slots in the head, means for actuating the wire-feeding means, manually-adjustable means for regulating the action of the wire-feeding means in accordance with requirements for forming varying numbers of staples in the slots in the head, and means for driving the formed staples out from the slots in the head to apply them to the work.

18. In a machine of the type indicated, a rotary stitcher-head having radial slots open at its rim, means to rotate said head about its axis, means for feeding wire-blanks across the periphery of the head at different locations spaced around its circumference to register the wire-blanks with the ends of said slots, means for forming the wire-blanks into staples inserted in said slots, means for operating the blank-feeding means, means for controlling the operation of said blank-feeding means to regulate the number of blanks fed across the rim of the head, and means for driving the formed staples out from the slots in the head to apply them to the work.

19. In a machine of the type indicated, a cylindrical stitcher-head having radial slots open at its periphery, means to rotate said head about its axis, means for feeding lengths of wire across the periphery of the head in register with the ends of the slots therein, means for forming the wire lengths into staples inserted in the slots in the head, means for actuating the wire-feeding means, means adjustable around the stitcher-head and adapted to operate the actuating means for the wire-feeding means to continuously feed the wire to the head to form a predetermined number of staples in the slots, and means to drive the formed staples out from the slots in the head to apply them to the work.

20. In a machine of the type indicated, a cylindrical stitcher-head having radial slots open at its periphery, means to rotate said head about its axis, a plurality of means for feeding lengths of wire across the periphery of the head in register with certain of the slots therein, means for forming the wire lengths into staples inserted in the slots in the head, a plurality of relatively stationary means spaced around the circumference of the head and adapted to actuate the wire-feeding means, means adjustable on the head for engagement with said actuating means to cause said feeding means to feed the wire lengths to the head in selected number to form a predetermined number of staples, and means to drive the formed staples out from the slots in the head to apply them in sequence to the work.

ARTHUR H. MAYNARD.

References Cited in the file of this patent

UNITED STATES PATENTS

| Number | Name | Date |
|---|---|---|
| 827,700 | Balze | Aug. 7, 1906 |
| 881,900 | Church | Mar. 17, 1908 |
| 1,174,965 | Brown | Mar. 14, 1916 |
| 1,796,143 | Davidson | Mar. 10, 1931 |
| 2,063,345 | Scott | Dec. 8, 1936 |
| 2,224,743 | Nolan | Dec. 10, 1940 |